United States Patent
Shrum, Jr. et al.

(10) Patent No.: US 8,380,528 B2
(45) Date of Patent: Feb. 19, 2013

(54) CONTROLLING SERVICE PROVIDED BY A PACKET SWITCHED NETWORK BASED ON BIDS FROM CONSUMER EQUIPMENT

(75) Inventors: Edgar Vaughan Shrum, Jr., Smyrna, GA (US); Jeffrey A. Aaron, Atlanta, GA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 2006 days.

(21) Appl. No.: 10/890,536

(22) Filed: Jul. 13, 2004

(65) Prior Publication Data

US 2006/0015354 A1 Jan. 19, 2006

(51) Int. Cl.
*G06Q 10/00* (2006.01)
*G06Q 40/00* (2006.01)
*G06F 15/173* (2006.01)

(52) U.S. Cl. .................. 705/1.1; 705/37; 709/226

(58) Field of Classification Search .............. 705/1, 37; 370/229, 230; 709/226
See application file for complete search history.

(56) References Cited

U.S. PATENT DOCUMENTS

| | | | | |
|---|---|---|---|---|
| 5,675,636 | A * | 10/1997 | Gray | 379/114.15 |
| 6,661,791 | B1 * | 12/2003 | Brown | 370/392 |
| 6,687,682 | B1 * | 2/2004 | Esfandiari et al. | 705/37 |
| 2004/0010592 | A1 * | 1/2004 | Carver et al. | 709/226 |
| 2004/0139088 | A1 * | 7/2004 | Mandato et al. | 707/100 |
| 2004/0203796 | A1 * | 10/2004 | Dunlop et al. | 455/445 |

OTHER PUBLICATIONS

Ibrahim et al. A Qos-based Charging and Resource Allocation Framework for Next Generation Wireless Networks, 2003, Wireless Commuincatins and Mobile Computing.*
Jean-Pierre Hubaux, Opportunities for Electronic Commerce in Networking, Sep. 1999, IEEE Communications Megazine.*

* cited by examiner

*Primary Examiner* — Naresh Vig
(74) *Attorney, Agent, or Firm* — Scott P. Zimmerman, PLLC

(57) ABSTRACT

Service that is provided by a packet switched network is controlled based on bids from a plurality of consumer equipment. Bids are requested from the consumer equipment. The bids are compared, and service by the packet switched network is controlled based the comparison. Access to the packet switched network may be selectively allowed or denied based on the comparison of the bids. The quality of service that is provided for information packets that are associated with at least some of the consumer equipment and communicated through the packet switched network may be controlled based on the bids.

22 Claims, 2 Drawing Sheets

CONTROLLING SERVICE PROVIDED BY A PACKET SWITCHED NETWORK BASED ON BIDS FROM CONSUMER EQUIPMENT

FIELD OF THE INVENTION

The present invention generally relates to the field of packet switched networks, and more particularly to controlling quality of service for information packets communicated through packet switched networks.

BACKGROUND OF THE INVENTION

The Internet has become a worldwide packet switched network for communicating not just data, such as email and pictures, but also for providing real-time bi-directional voice communications. The Internet includes a worldwide web (WWW) of client-server based facilities on which Web pages and files can reside, as well as clients (Web browsers) that can interface users with the client-server facilities. The topology of the WWW can be described as a network of networks, with providers of network service called Network Service Providers. Servers that provide application-layer services may be described as Application Service Providers. Sometimes a single service provider does both functions within a single business.

In recent years, broadband access technologies have facilitated the communication of voice, video, and data over the Internet and other public and private packet switched networks. Because broadband technologies are typically deployed by a single transport service provider, like a Regional Bell Operating Company (RBOC), their packet switched networks are often shared by many network service providers and application service providers.

Service providers can offer services that range from Internet access and virtual private network access to Voice over IP, Video on Demand, and Gaming. Because such services can have vastly different network resource requirements, some service providers can offer varying levels of Quality of Service (QoS) to subscribers. For example, service providers may allow subscribers to mark their packet communications with a requested QoS level. Such markings may be made by consumer equipment that the subscriber uses to interface to a packet switched network. The packet switched network may then, based on the requested QoS level and its presently available resources, vary the communication bandwidth and priority that it uses to communicate that subscriber's packet communications. However, when insufficient resource are available, access to the packet switched network may be denied, or a QoS request may be denied or only a lower than requested QoS may be granted.

SUMMARY OF THE INVENTION

Some embodiments of the present invention provide methods of controlling service that is provided by a packet switched network to a plurality of consumer equipment. Bids are requested from the consumer equipment. Bids from the consumer equipment are compared. Service that is provided by the packet switched network to the consumer equipment is controlled based on the comparison. Accordingly, a packet switched network may allocate its resources, at least in part, based on a bids that it receives from consumer equipment.

In some further embodiments of the present invention, control of service can include selectively allowing or denying access by the consumer equipment to the packet switched network based on the comparison. Control of service can include controlling Quality of Service (QoS) levels provided for information packets associated with at least some of the consumer equipment and communicated through the packet switched network based on the comparison. Accordingly, a consumer equipment that is associated with a high bid may be granted access to the packet switched network and granted a higher QoS while another consumer equipment that is associated with a lower bid may be denied access to the packet switched network or may be granted a lower QoS.

Some other embodiments of the present invention provide a packet switched network that includes a bid based service control system. The bid based service control system is configured to request bids from a plurality of consumer equipment, to compare the bids, and to control service provided to the consumer equipment for the packet switched network based on the comparison. The bid based service control system may be configured to selectively allow or deny access by the consumer equipment to the packet switched network based on the comparison. The bid based service control system may be configured to control Quality of Service (QoS) levels that are provided for information packets associated with at least some of the consumer equipment based on the comparison.

Some other embodiments of the present invention provide consumer equipment that includes a controller that is configured to communicate information packets through a packet switched network, to generate a bid for service from the packet switched network, and to communicate the generated bid to the packet switched network. The controller may generate a higher bid based upon a received indication of a denial of access to the packet switched network.

Other methods, packet switched networks, consumer equipment and/or computer program products according to embodiments will be or become apparent to one with skill in the art upon review of the following drawings and detailed description. It is intended that all such additional methods, packet switched networks, consumer equipment and/or computer program products be included within this description, be within the scope of the present invention, and be protected by the accompanying claims.

DETAILED DESCRIPTION OF THE INVENTION

Figure 1:
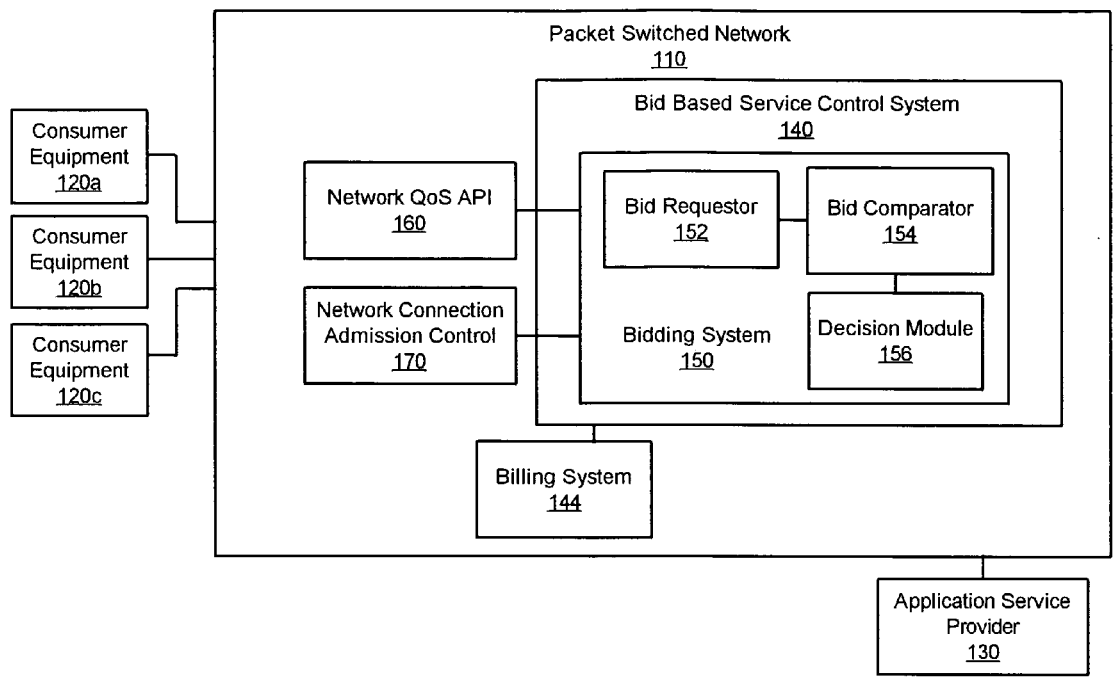
FIG. 1 is a block diagram of a communication system and method that control service by a packet switched network based on bids from consumer equipment according to some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

The present invention may be embodied as methods, packet switched networks, and/or consumer equipment. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or operational illustrations of methods, packet switched networks, and consumer equipment according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

FIG. 1 is a block diagram of a communication system 100 and method that includes a packet switched network 110, consumer equipment 120*a-c*, and an application service provider 130. The packet switched network 110 can route information packets between the consumer equipment 120*a-c* and the application service provider 130, and may route the information packets to various other networks, equipment, and/or service providers. According to some embodiments of the present invention, the packet switched network 110 includes a bid based service control system 140, a billing system 144, a network QoS application interface (API) 160, and a network connection admission control 170.

As used herein, the term "consumer equipment" includes any device that is configured to communicate information packets with a packet switched network, and includes, but is not limited to, a cable modem, a digital subscriber line modem, a public switched telephone network modem, a wireless local area network modem, a wireless wide area network modem, a computer with a modem, a mobile terminal such as personal data assistant and/or cellular telephone with a modem. For consumer equipment that communicates with a packet network through a wireless interface, the consumer equipment may be configured to communicate via a wireless protocol such as, for example, a cellular protocol (e.g., General Packet Radio System (GPRS), Enhanced Data Rates for Global Evolution (EDGE), Global System for Mobile Communications (GSM), code division multiple access (CDMA), wideband-CDMA, CDMA2000, and/or Universal Mobile Telecommunications System (UMTS)), a wireless local area network protocol (e.g., IEEE 802.11), a Bluetooth protocol, another RF communication protocol, and/or an optical communication protocol.

The bid based service control system 140 is configured to request bids from the consumer equipment 120*a-c*, to compare the bids therefrom, and to control service that is provided to the consumer equipment 120*a-c* by the packet switched network 110 based on the comparison of the bids. Access to the packet switched network 110 may thereby be selectively allowed or denied by the bid based service control system 140 based on the comparison of the bids. Alternatively, or additionally, the Quality of Service (QoS) that is provided for information packets that are associated with at least some of the consumer equipment 120*a-c* and communicated through the packet switched network 110 may be controlled by the bid based service control system 140 based on the bids. Accordingly, the packet switched network 110 may seek bids from the consumer equipment 120*a-c*, and control the services that are provided thereto based on their bids.

As used herein, the term "bid" refers to an offer of a monetary payment, or other offer for value, in exchange for service by the packet switched network 110, where such service may including allowing access to the packet switched network 110 and/or may include allowing a higher QoS as described herein. The form of a bid may include or incorporate: special packet markings or special data included in the communications, special bid messages transmitted over the network, special protocols or procedures used in the network, and special "out-of-band" communications that do not use the network or may use another separate network. For instance, at least some of the bids, such as special bid messages, may include: an identification of an associated bidder, an indication of the authorization of the associated bidder, an indication of the certification of the associated bidder, an indication of the type of the bid, an indication of the amount of an amount of the bid, an indication of a sequence number of the bid (if one of the bids in a sequence), a time period for the bid (e.g., a time period during which the bid is valid), and/or a digital signature.

For example, when a bid from one of the consumer equipment 120*a* is larger than a bid from another one of the consumer equipment 120*b*, the consumer equipment 120*a* may be allowed to access, and communicate through, the packet switched network 110 while the consumer equipment 120*b* may be denied access to, and thereby prevented from communicating through, the packet switched network 110. In another example, when a bid from the consumer equipment 120*a* is larger than a bid from the consumer equipment 120*b*, the consumer equipment 120*a* may be allowed to have a higher level of QoS than the consumer equipment 120*b* for communication of its associated information packets through the packet switched network 110. Accordingly, a subscriber may offer, via a bid, to pay a network operator money to obtain access and/or a higher QoS than would otherwise be obtainable, such as due to heavy utilization of network resources and/or a subscription level of a subscriber. The higher QoS may correspond to an increase in QoS over an earlier granted QoS for communications.

The bid based service control system 140 may control a QoS level by controlling any characteristic relating to how information packets can be communicated through the packet switched network 110. For example, the bid based service control system 140 may control a capacity (e.g., bandwidth) in the packet switched network 110 that is allowed to be used to communicate information packets associated with the consumer equipment 120a-c, may control communication delay in the packet switched network 110 for the information packets, may control a loss rate so that no more information in a information packet is lost than is allowed by the allowed loss rate, may control prioritization in the packet switched network 110 of the information packets, and/or may control a traffic profile for the information packets. A traffic profile may correspond to performance characteristics such as, for example, long term maximum packet traffic rate and/or short term packet burst size, and may vary in a predefined manner over time.

The bid based service control system 140 may include a bidding system 150, and may include at portion of the network QoS application interface (API) 160, and the network connection admission control 170. The bidding system 150 may include a bid requestor 152, a bid comparator 154, and a decision module 156. As will be appreciated, the functions/acts of the bid based service control system 140 may be combined and/or divided among the illustrated elements and/or other elements without departing from the scope of the present invention.

The network connection admission control 170 selectively allows or denies access to the packet switched network 110 by the consumer equipment 120a-c based on resources (e.g., bandwidth) that are available in the packet switched network 110 for use by the consumer equipment 120a-c and/or based on bid(s) from the consumer equipment 120a-c. When the consumer equipment 120a-c requests access to the packet switched network 110 and insufficient resources are available, the network connection admission control 170 may provide the requesting consumer equipment 120a-c an indication of denied access.

The determination of the sufficiency of available resources may be based on whether a threshold amount of resources in the packet switched network 110 are being used or are otherwise committed and/or reserved for use, based on a change over a known time in the amount of resources that are used, and/or based on a prediction of resource use, such as based on a time of day, day of week, day of month, and/or a day of year. Prediction of the availability of resources may be carried out by recording a history of resource utilization, and associating resource utilization with time of day, day of week, day of month, and/or day of year. Accordingly, the bidding system 150 may initiate a bidding based resource grant process based on the predicted availability of resources. The threshold amount of resources may be determined so as to reserve an amount of the resources for granting through a bidding based granting process. For example, when 85% of the resources in the packet switched network 110 are being used or predicted to be used, the last 15% of available resources may be allocated to consumer equipment by the bidding based granting process.

The network QoS API 160 controls the QoS allowed for information packets that are communicated through the packet switched network 110 and associated with the consumer equipment 120a-c. The consumer equipment 120a-c may request a QoS level for information packets that are communicated therewith through the packet switched network 110. A QoS request may be communicated from the consumer equipment 120a-c as part of an information packet to the packet switched network 110. A requesting one of the consumer equipment 120a-c may, for example, make a QoS request on its own initiative and/or in response to a request from another one of the consumer equipment 120a-c and/or from an application that is hosted by the application service provider 130.

The network QoS API 160 may evaluate a QoS request based on available resources in the packet switched network 110 and/or based on bid(s) from the consumer equipment 120a-c. When the consumer equipment 120a-c requests a QoS level and insufficient resources are available, the network QoS API 160 may provide the requesting consumer equipment 120a-c an indication of a denied request, and/or may grant the requesting consumer equipment 120a-c less QoS than requested, and may indicate such grant thereto. The determination of the sufficiency of available resources may be based on whether a threshold amount of resources in the packet switched network 110 are being used or are otherwise committed and/or reserved for use, based on a change over a known time in the amount of resources that are used, and/or based on a prediction of resource use, such as based on a time of day, day of week, day of month, and/or a day of year, such as was described above.

The bidding requestor 152 may generate and communicate a bidding request to the consumer equipment 120a-c. The bidding request may be generated based on the availability of resources in the packet switched network 110 to satisfy an access request and/or when a threshold amount of resources in the packet switched network 100 are being used and/or when a threshold amount of resources in the packet switched network 100 are predicted to be used and/or a QoS request from requesting ones of the consumer equipment 120a-c. The requesting consumer equipment 120a-c may communicate bids to the bidding system 150. A bid may be generated by a user, such as responsive to a bid request prompt, and/or may be generated by an automated bidding agent in the requesting consumer equipment 120a-c, which generates a bid on behalf of a user, which may also be in response to a bid request prompt. Bidding agents are described below with regard to FIG. 2.

Accordingly, the bidding system 150 may receive a bid from each of the consumer equipment 120a-c. The bid comparator 154 compares the bid(s) to each other and/or compares the bid(s) to one or more threshold values. Based on the comparison(s), the decision module 156 decides which, if any, of the bids are accepted or rejected. The network connection admission control 170 can then selectively allow or deny access to the packet switched network 110 by the consumer equipment 120a-c based on the decision(s) by the decision module 156. The network QoS API 160 can control the QoS allowed for information packets that are communicated through the packet switched network 110 and associated with the consumer equipment 120a-c based on the decision(s) by the decision module 156. When a bid is accepted, the offered payment or other value can be recorded in the billing system 144, which can seek remuneration from the subscriber who is associated with the bidding consumer equipment.

Based on the comparison(s) by the bid comparator 154, the decision module 156 may generate, via the bid requestor 152, and communicate a request for a higher bid to one or more requesting consumer equipment 120a-c. For example, bids may be selectively accepted or rejected based on their relative value, and requests for higher bids may be communicated to consumer equipment 120a-c associated with rejected bids. Alternatively, or additionally, an indication of denial of access and/or an indication of a QoS grant than is less than a requested QoS may be communicated to the consumer equipment 120a-c associated with rejected bids, which may be interpreted by that consumer equipment 120a-c as a request for a higher bid. The decision module 156 may then make further decisions regarding accepting or rejecting the present bids and/or further bids (re-bids) from the consumer equipment 120a-c. The decision module 156 may repeat the re-bidding process based on the initial bids and/or re-bids until a predetermined condition is met, such as expiration of a timer and/or reaching a threshold limit to the number of re-bid attempts.

The decision module 156 may, for example, wait a threshold time after communicating the requests for higher bids before causing the network connection admission control 170 to selectively allow or deny access to the associated consumer equipment 120a-c and/or before causing the network QoS API 160 to allow QoS level(s) for the associated consumer equipment 120a-c. Alternatively, or additionally, the decision module 156 may accept some bids, and allow access and/or allow QoS level(s) for the associated consumer equipment, while rejecting other bids and requesting higher bids from their associated consumer equipment. The decision module 156 may group the bids in a plurality of groups, and then selectively accept or reject bids based on their grouping. Bids in one group may be accepted, with access and/or QoS being controlled responsive thereto, while bids in another group may be rejected and higher bids may be sought from the associated consumer equipment.

The network QoS API 160 may control QoS by selecting a QoS level from among a plurality of QoS levels based on each of the bids from the consumer equipment 120a-c and/or based on groups of bids. For example, the network QoS API 160 may include a ranked group of QoS levels (e.g., ranked high to low QoS levels). A QoS request can then be evaluated based on an associated bid or its association with a group of bids, and a QoS level can be selected from among the group of QoS levels.

The decision module 156 may accept a bid based on a history of high bids from one of the consumer equipment 120a-c, although the bid may be lower than other bids that it has received from other of the consumer equipment 120a-c. A subscriber may thereby be granted access, a higher priority of access, and/or a higher QoS level than the subscriber's bid would otherwise have caused due to a known history of a subscriber's participation in a bidding process (e.g., history of earlier bids accepted by the bidding system 150). Accordingly, a subscriber may be rewarded for earlier participation in the bidding process. A bid may also be accepted based on a priority indication from the consumer equipment 120a-c. For example, a bid may be accepted when it is determined that one of the consumer equipment 120a-c is attempting a voice over Internet protocol (VoIP) to an emergency response center (e.g., a call to a 911 or other emergency number). A bid may also be accepted or denied based on a subscription level (e.g., subscription tier) of a subscriber who is associated with the consumer equipment.

Although FIG. 1 illustrates an exemplary communication system 100, it will be understood that the present invention is not limited to such a configuration, but is intended instead to encompass any configuration capable of carrying out the operations described herein. For example, although only three consumer equipment 120a-c and a single bid based service control system 140 and application service provider 130 have been shown for illustration purposes, it will be understood that the packet switched network 110 would generally route information packets among thousands of consumer equipment and numerous application service providers.

Figure 2:
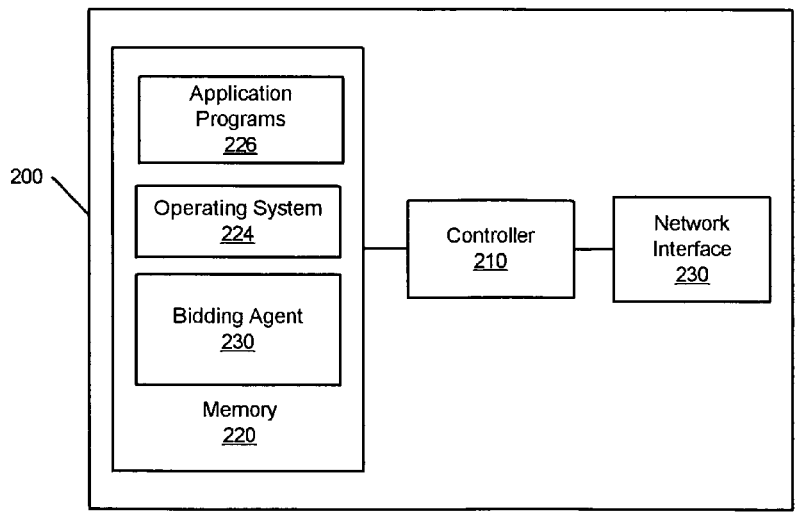
FIG. 2 is a block diagram of a consumer equipment and method that generates bids according to some embodiments of the present invention.

Referring now to FIG. 2, an exemplary consumer equipment 200 is shown. The consumer equipment 200 includes a controller 210, a memory 220, and a network interface 230. The memory 220 is representative of the overall hierarchy of memory devices containing an operating system 224, application programs 226, and a bidding agent 230 to implement the functionality of the consumer equipment 200. The bidding agent 230 provides operations that may be executed to configure the controller 210 to generate bids for service, such as by the function/acts described herein, and to communicate the bids, via the network interface 230, to a packet switched network. The controller 210 is also configured to communicate information packets via the network interface 230 to a packet switched network.

The controller 210 is configured to evaluate a request for a bid from the packet switched network based on predetermined rules, and to selectively generate or not generate a higher bid based on the evaluation. The request for a bid may be an indication from the packet switched network that access to the packet switched network has been denied and/or that a requested QoS level has not been allowed. The controller 210 may selectively determine whether to generate a bid and/or a re-bid, and/or may determine an amount to be offered in a bid based on, for example, one or more of the following considerations: which subscriber is presently using the consumer equipment 200; which of the application programs 226 are attempting access and/or requesting a QoS level; a time of day, day of week, day of month, and/or day of year; a threshold limit on bid offers and/or re-bid offers; a threshold limit on a number of re-bids; and/or a QoS level that has been granted. The amount to be offered in a bid and/or a re-bid may alternatively, or additionally, be determined based on an amount defined by the packet switched network.

Figure 3:
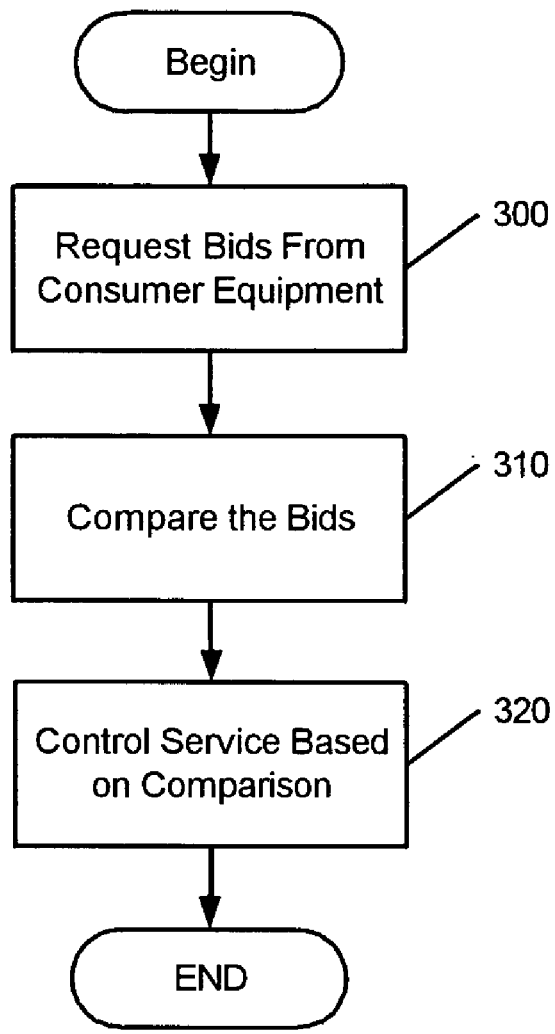
FIG. 3 is a flow chart illustrating operations for controlling service provided a packet switched network to a plurality of consumer equipment based on bids.

Referring now to FIG. 3, a flow chart is shown that illustrates operations for controlling service provided by a packet switched network to a plurality of consumer equipment based on bids. At Block 300, bids are requested from the consumer equipment. At Block 310, bids that are received from the consumer equipment are compared. At Block 320, service that is provided by the packet switched network to the consumer equipment is controlled based on the bids.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method, comprising:
provisioning services to a plurality of consumer equipment communicating with a packet switched network;
recording historical resource utilization of the packet switched network;
predicting a time of day when a threshold amount of services will be used in the packet switched network;
reserving a remaining amount of services in the packet switched network to a bid-based granting process;
sending bid requests from a server to each consumer equipment in the plurality of consumer equipment;

receiving bids at the server from bidding agents operating in the plurality of consumer equipment;

retrieving historical bids earlier accepted by the server from a bidding agent submitting a bid;

comparing the bids by the server against each other;

determining one of the consumer equipment has a history of high bids accepted by the server;

determining the one consumer equipment has currently submitted a lower bid than other of the consumer equipment; and granting by the server a higher priority access to the one consumer equipment despite the lower bid.

2. The method of claim 1, further comprising denying access to the packet switched network based on the comparison.

3. The method of claim 2, further comprising allowing access to the remaining amount of services in the packet switched network for a highest bid from the other of the consumer equipment, and denying access to the remaining amount of services in the packet switched network for lower bids from the other of the consumer equipment.

4. The method of claim 1, further comprising controlling quality of service provided by the packet switched network based on a comparison of bids from the other of the consumer equipment.

5. The method of claim 4, wherein controlling the quality of service comprises allowing a higher quality of service for the one the other consumer equipment associated with a higher bid.

6. The method of claim 1, further comprising rejecting the bid from the other of the consumer equipment.

7. The method of claim 1, further comprising requesting a higher bid from the other of the consumer equipment.

8. The method of claim 1, further comprising denying access to the packet switched network to the other of the consumer equipment based on the bid.

9. The method of claim 1, further comprising identifying a winning bid from the bids received from other of the consumer equipment.

10. The method of claim 1, further comprising;
awarding access to the remaining amount of services in the packet switched network to the one other of the consumer equipment.

11. The method of claim 1, wherein comparing the bids comprises identifying a winning bid based on a priority indication equipment.

12. The method of claim 1, further comprising requesting higher bids bid from the other of the consumer equipment.

13. The method of claim 12, further comprising:
identifying a first group of the plurality of the other consumer equipment having higher bids than a second group of the plurality of consumer equipment;
allowing access by the first group of the plurality of the other consumer equipment to the remaining amount of services in the packet switched network;
denying access to the second group of the plurality of the other consumer equipment to the remaining amount of services in the packet switched network; and
requesting higher bids from the second group of the plurality of the other consumer equipment.

14. The method of claim 12, further comprising:
identifying a first group of the plurality of the other consumer equipment having higher bids than a second group of the plurality of consumer equipment;
allowing higher quality of service for the first group of the plurality of the other consumer equipment than for the second group of the plurality of the other consumer equipment; and
requesting higher bids from the second group of the plurality of the other consumer equipment.

15. The method of claim 1, further comprising billing a subscriber based on the bid.

16. A packet switched network comprising:
a server configured to:
record historical resource utilization of the packet switched network;
predict a time of day when a threshold amount of services will be used in the packet switched network;
reserve a remaining amount of services in the packet switched network to a bid-based granting process;
send a bid request to each consumer modem in a plurality of consumer modems;
receive bids from bidding agents operating in the plurality of consumer modems;
retrieve historical bids earlier accepted by the server from each bidding agent submitting a bid;
compare the bids by the server against each other;
determine one of the bidding agents has a history of high bids accepted by the server;
determine the bidding agent has currently submitted a lower bid than other of the bidding agents;
grant by the server a higher priority access to the bidding agent despite the lower bid as a reward for the history of high bids; and
control the remaining amount of services provided to remaining consumer modems in the plurality of consumer modems by the packet switched network based on a comparison of the bids against each other.

17. The packet switched network of claim 16, wherein the server selectively permits access to the packet switched network to remaining consumer modems based on the comparison.

18. The packet switched network of claim 16, wherein the server denies access to the packet switched network to remaining consumer modems based on the comparison.

19. The packet switched network of claim 16, wherein the bid comprises an identification of an associated bidder.

20. The packet switched network of claim 16, wherein the server requests higher bids from the remaining consumer modems for access to the packet switched network.

21. The packet switched network of claim 16, wherein the server denies access to the packet switched network to the consumer modem with a low bid.

22. The packet switched network of claim 16, further comprising a billing system that is configured to bill a subscriber based on the bid.

* * * * *